Jan. 25, 1944.   W. A. RAY   2,339,809
THERMOCOUPLE STRUCTURE
Filed March 17, 1941
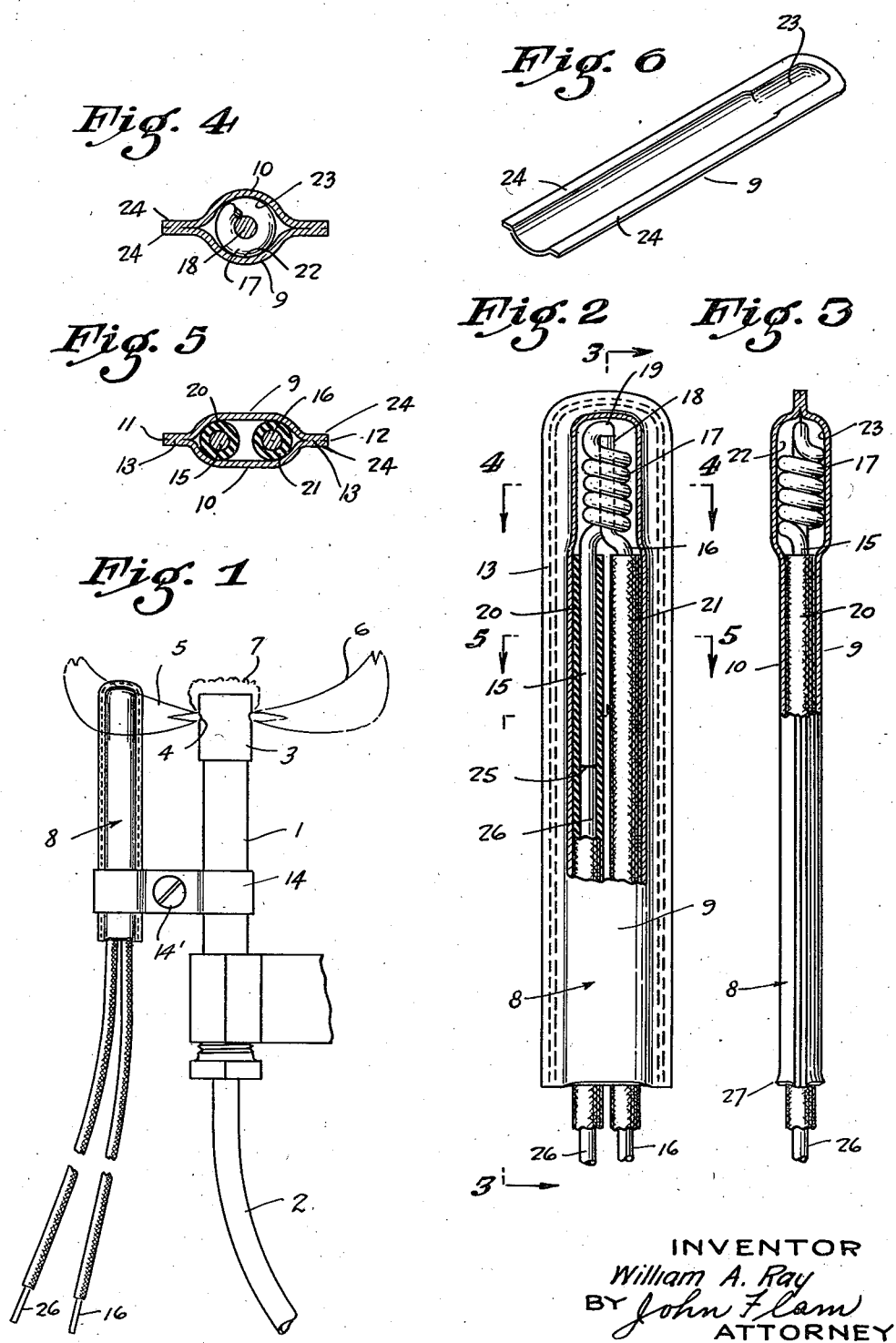
INVENTOR
William A. Ray
BY John F. Flam
ATTORNEY Patented Jan. 25, 1944

2,339,809

UNITED STATES PATENT OFFICE 2,339,809

THERMOCOUPLE STRUCTURE

William A. Ray, Glendale, Calif.

Application March 17, 1941, Serial No. 383,695

5 Claims. (Cl. 136—4)

This invention relates to the generation of electrical energy by the aid of heat. Thermocouples for the conversion of heat energy into electrical energy have been used and are now well known. They depend for their operation upon applying heat at a "hot junction" between dissimilar metals. The greater the temperature differential between the hot junction and the cold junctions forming the terminals of the metals, the greater the amount of electrical energy generated.

Such thermocouple structures are now commonly used in control systems as for fuel burner apparatus. For example, the hot junction of the thermocouple may be arranged to be influenced by the flame of a pilot burner. When the flame is extinguished, the generation of electricity ceases, and control devices are caused to function in response to the cessation of flow of electrical energy. For example, a valve controlling the supply of fuel to the main burner may be caused to close. The thermocouple structure must be made as to be capable of resisting the high temperatures of the flame without serious deterioration, and the electrical energy generated must be sufficient to permit such control functions to be obtained.

It is one of the objects of this invention to make it possible to obtain these useful results by the aid of an inexpensive and simple structure.

Suitable materials for the dissimilar metals forming the thermocouple, that can withstand the high temperatures are such alloys as Chromel and Copel. These however are quite expensive and accordingly it is desirable to reduce the lengths of these conductors as much as possible. But short thermocouple conductors may result in higher temperatures at the cold junctions. It is accordingly another object of this invention to provide a thermocouple structure in which economy of materials may be obtained and yet a greater temperature differential is obtained, resulting in increased power.

A thermocouple structure built in accordance with this invention includes a metal sheath or casing that may be inserted in a flame. A sheathed thermocouple is shown and claimed in Patent No. 2,289,455 dated July 14, 1942, in the name of William A. Ray and entitled: "Thermocouple structure." The present invention also involves the use of a casing, which is so arranged that it does not impede flame travel. The casing has a tip that is uniformly heated, resulting in freedom from cold spots. The exterior area of the sheath or casing that is subjected to the flame is quite large, ensuring efficient heat transfer to the hot junction.

This invention possess many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a side elevation of a thermocouple structure incorporating the invention, shown as used with a pilot burner;

Fig. 2 is an enlarged side elevation, partly broken away, of a thermocouple structure incorporating the invention;

Fig. 3 is a longitudinal sectional view taken along plane 3—3 of Fig. 2;

Figs. 4 and 5 are sectional views taken along planes 4—4 and 5—5 of Fig. 2; and

Fig. 6 is a pictorial view of one of the elements of the structure.

In Figure 1 the pilot burner I is shown as a vertically extending pipe adapted to be connected to a source of fuel as by the aid of the conduit 2. At the upper end of the burner I there is a jet 3. This jet may be provided with diametrically opposite openings such as indicated by the reference character 4, from which pilot flames 5 and 6 may issue. Connecting the flames 5 and 6 is an igniting flame 7 adapted to issue from an appropriate narrow passageway across the top of jet 3, so as to ensure that the pilot flames 5 and 6 may be simultaneously ignited.

The thermocouple structure 8 incorporating the invention comprises a metallic sheath or casing including the halves 9 and 10 (Figs. 2, 3, 4 and 5). These halves or shells may be made from thin stainless steel; and upon assembly the contacting flanges 24 along the edges 11 and 12 may be welded together as by stitch welding. This welding is indicated diagrammatically by the dotted lines 13 of Fig. 2.

The casing formed of the halves 9 and 10 is arranged to be so supported that its upper end is inserted within the flame 5. This support is so arranged furthermore that the flame 5 extends around the shell 9—10, the casing being presented edgewise to the flame. The flame 5 streams naturally around the shell, which forms little resistance to the flame travel. There is thus no substantial likelihood of any cold spots adjacent the hot junctions.

One manner in which the thermocouple structure 8 may be thus supported is illustrated in Fig. 1. A bracket structure 14 which may comprise two halves, is arranged to encompass the burner 1 as well as the lower portion of the thermocouple structure 8. A bolt or screw 14' holds the two halves of the bracket structure together so as to clamp the burner 1 and the thermocouple structure 8 between them.

The thermoelectric conductors in this case comprise the conductors 15 and 16. These are of dissimilar metals or alloys such as Chromel and Copel. The hot junction is formed in this instance by twisting an end of one conductor through several turns or convolutions around the end of the other conductor. In this instance the conductor 15 (which may be of Chromel), is shown as being twisted or turned several times to form the convolutions 17 about the upper end 18 of the conductor 16. The extremity 19 of the conductor 15 may be bent over to contact the top surface of the end 18. Preferably the convolutions 17 are fused to the end 18.

The hot junction of the thermocouple structure therefore includes the convolutions 17 about the end 18, which forms a central core for these convolutions. Heat is transmitted to this hot junction by conduction through the wall of the shell or casing 9—10.

The conductors 15 and 16 are disposed side by side within the shell or casing 9—10 as shown most clearly in Figs. 2 and 5. These conductors may be covered with a refractory insulation material such as sleeves 20 and 21 made from braided spun glass. The sides of the casing 9—10 closely encompass these covered portions of the conductors 15 and 16. Furthermore, the insulation sleeves 20 and 21 extend substantially up to the convolutions 17.

For the accommodation of the convolutions 17 each of the halves 9 and 10 carry deeper recesses 22 and 23 adjacent the top ends of the shells. This is indicated most clearly in Figs. 3, 4 and 6. The half casings as shown most clearly in Fig. 6 have the flat flanges 24 which are placed in contact and along which the stitch weld 15 may be run.

The Chromel conductor 15 may end within the sheath or casing 9—10 as illustrated at the joint 25 (Fig. 2). A copper lead 26 may be joined to the end 25 and is shown as extending downwardly out of the casing. The Copel conductor 16 may extend for a considerable distance to a point of connection outside the furnace chamber or into the cold air stream, such as secondary air. This may be done without material loss of electrical energy, since the resistance of Copel wire is considerably less than that of Chromel, out of which the conductor 15 is made.

Since the thermoelectric properties of copper and Chromel are quite similar, the junction 25 does not form a thermoelectric cold junction at the joint 25. Efficient cold junctions are actually formed at the ends of the copper lead 26 and the Copel lead 16. These cold junctions, being located out of the furnace chamber or to the cold air stream, have temperatures considerably below that of the hot junction formed by the convolutions 17 and the end 18. The glass braided sleeves 20 and 21 may extend for a considerable distance beyond the bottom of the casing 9—10. Furthermore, in order to avoid injury to the braids 20, 21, the lower edges of the casing 9 and 10 may be slightly flared outwardly as indicated at 27.

The manner of assembly of the thermocouple structure is clear from the foregoing. The conductors 15 and 16 are first assembled as in the form illustrated and the copper lead 26 is joined to the end of the Chromel conductor 15. The refractory insulation sleeves 20—21 may then be applied and the thermocouple structures laid into one of the two casing halves 9 or 10. The other casing half may then be disposed over the first casing half and the flanges 24 stitch welded together.

Due to the bulbous enlargement at the upper end of the thermocouple structure there is no danger that the device 9—10 be inadvertently pulled off from the conductors. The conductors are firmly held between the casing halves.

The flame 5 playing over the upper end of the thermocouple structure causes the casing 9—10 to be heated; and this heat is transmitted to the upper portions of the conductors 15 and 16 forming the hot junction. The glass braided sleeves 20 and 21 and the casing 9—10 form a protection against undue transference of heat to the lower portions of the thermoelectric conductors.

What is claimed is:

1. In a thermal structure, a pair of thermoelectric conductors, the ends of said conductors being so joined electrically and mechanically that the junction forms an enlarged end for the structure, refractory insulation material disposed over other parts of the conductors, and a metal shell disposed over and covering the hot junction, and in thermal contact therewith, said shell extending beyond the hot junction over the conductors, said shell having an enlarged recess for accommodating the enlarged end, said recess cooperating with said enlarged end to retain said structure in the shell.

2. In a thermocouple structure, a pair of thermoelectric conductors arranged side by side, the ends of the conductors being bare, the end of one conductor being wound about the end of the other conductor to provide a mechanical and electrical joint and forming the hot junction for the thermocouple, refractory insulation material covering other parts of the conductors to a point adjacent said hot junction, and a metal shell covering the hot junction and in thermal contact therewith, said shell having an enlarged recess for accommodating the ends, and cooperating with said ends to retain said structure in the shell, said shell extending as well over at least a part of the covered conductors.

3. In a thermocouple structure, a pair of thermoelectric conductors, the ends of said conductors being so joined electrically an mechanically that the junction forms an enlarged end for the structure, refractory insulation material disposed over other parts of the conductors, and a longitudinally split shell formed of halves each having a flange extending outwardly of the shell, the flanges being joined to form the complete shell, said shell being in thermal contact with the hot junctions, and having an enlarged recess at one end cooperating with the hot junction to retain said structure in the shell, and the shell having a portion extending over the covered portions of the conductors.

4. In a thermocouple structure, a pair of conductors, ends of the conductors being joined to form a hot junction portion occupying a space of greater cross section than that required by the conductors placed side by side, refractory insulating material covering each conductor to a place adjacent said portion, and a metal shell in thermal contact with said hot junction and enclosing at least a portion of said conductors as well as said hot junction portion, said shell having a reduced portion for accommodating the conductors as well as a recess for closely embracing said enlarged portion, whereby said structure and the shell are retained in assembled relationship.

5. In a thermocouple structure, a pair of conductors, ends of the conductors being joined to form a hot junction portion occupying a space of greater cross section than that required by the conductors placed side by side, refractory insulating material covering each conductor to a place adjacent said portion, a metal shell enclosing at least a portion of said conductors as well as said hot junction portion, and in thermal contact therewith, said shell having a reduced portion for accommodating the conductors as well as a recess for closely embracing said enlarged portion, whereby said structure and the shell are retained in assembled relationship, one of said conductors being relatively long and extending out of the shell for a substantial distance, the other conductor being relatively short and terminating in the shell, and being joined to a lead therein, said lead extending out of the shell for a substantial distance, the cold junctions for the structure being respectively at the outer ends of the lead and of the long conductor.

WILLIAM A. RAY.